United States Patent
Kao

(10) Patent No.: US 12,322,997 B1
(45) Date of Patent: Jun. 3, 2025

(54) UNINTERRUPTED POWER SUPPLY FOR EXISTING SMART LOCKS

(71) Applicant: Cyrus Kao, Nashville, TN (US)

(72) Inventor: Cyrus Kao, Nashville, TN (US)

( * ) Notice: Subject to any disclaimer, the term of this patent is extended or adjusted under 35 U.S.C. 154(b) by 0 days.

(21) Appl. No.: 18/581,589

(22) Filed: Feb. 20, 2024

(51) Int. Cl.
*H02J 9/06* (2006.01)
*H02J 7/00* (2006.01)
*H02J 7/35* (2006.01)

(52) U.S. Cl.
CPC ............ *H02J 9/061* (2013.01); *H02J 7/0068* (2013.01); *H02J 7/35* (2013.01)

(58) Field of Classification Search
CPC ...... H02J 9/06; H02J 9/061; H02J 7/00; H02J 7/0068; H02J 7/35
See application file for complete search history.

(56) References Cited

U.S. PATENT DOCUMENTS

| 9,317,984 | B2 | 4/2016 | Cregg |
| 9,852,564 | B2 | 12/2017 | Henderson |
| D988,833 | S | 6/2023 | Liao |
| 2009/0183542 | A1 | 7/2009 | Pollabauer |
| 2011/0018680 | A1 | 1/2011 | Lai |
| 2020/0349786 | A1 | 11/2020 | Ho |

FOREIGN PATENT DOCUMENTS

WO 2008017086 2/2008

*Primary Examiner* — Robert L Deberadinis
(74) *Attorney, Agent, or Firm* — Kyle A. Fletcher, Esq.

(57) ABSTRACT

The uninterrupted power supply for existing smart locks includes one or more rechargeable batteries, a power conditioner, a solar panel, and an AC adapter. The uninterrupted power supply for existing smart locks may be operable to provide uninterruptable power to a smart lock coupled to a door. The one or more rechargeable batteries may replace one or more disposable batteries in the smart lock and may electrically couple to the power conditioner. The power conditioner may electrically couple to the solar panel, the AC adapter, or both and may condition power from the solar panel and/or the AC adapter for use in recharging the one or more rechargeable batteries. As non-limiting examples, the solar panel may be mounted on the exterior side of the door, the interior side of the door, or elsewhere on the exterior of the building.

20 Claims, 4 Drawing Sheets

UNINTERRUPTED POWER SUPPLY FOR EXISTING SMART LOCKS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of recharging systems and smart locks, more specifically, an uninterrupted power supply for existing smart locks.

Summary of Invention

The uninterrupted power supply for existing smart locks comprises one or more rechargeable batteries, a power conditioner, a solar panel, and an AC adapter. The uninterrupted power supply for existing smart locks may be operable to provide uninterruptable power to a smart lock coupled to a door. The one or more rechargeable batteries may replace one or more disposable batteries in the smart lock and may electrically couple to the power conditioner. The power conditioner May electrically couple to the solar panel, the AC adapter, or both and may condition power from the solar panel and/or the AC adapter for use in recharging the one or more rechargeable batteries. As non-limiting examples, the solar panel may be mounted on the exterior side of the door, the interior side of the door, or elsewhere on the exterior of the building.

An object of the invention is to provide one or more rechargeable batteries for a smart lock.

Another object of the invention is to provide a solar panel for recharging the one or more rechargeable batteries.

A further object of the invention is to provide an AC adapter for recharging the one or more rechargeable batteries Yet another object of the invention is to provide a power conditioner to route electrical power from the solar panel and the AC adapter to the rechargeable batteries and/or to condition the electrical power.

These together with additional objects, features and advantages of the uninterrupted power supply for existing smart locks will be readily apparent to those of ordinary skill in the art upon reading the following detailed description of the presently preferred, but nonetheless illustrative, embodiments when taken in conjunction with the accompanying drawings.

In this respect, before explaining the current embodiments of the uninterrupted power supply for existing smart locks in detail, it is to be understood that the uninterrupted power supply for existing smart locks is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the uninterrupted power supply for existing smart locks.

It is therefore important that the claims be regarded as including such equivalent construction insofar as they do not depart from the spirit and scope of the uninterrupted power supply for existing smart locks. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
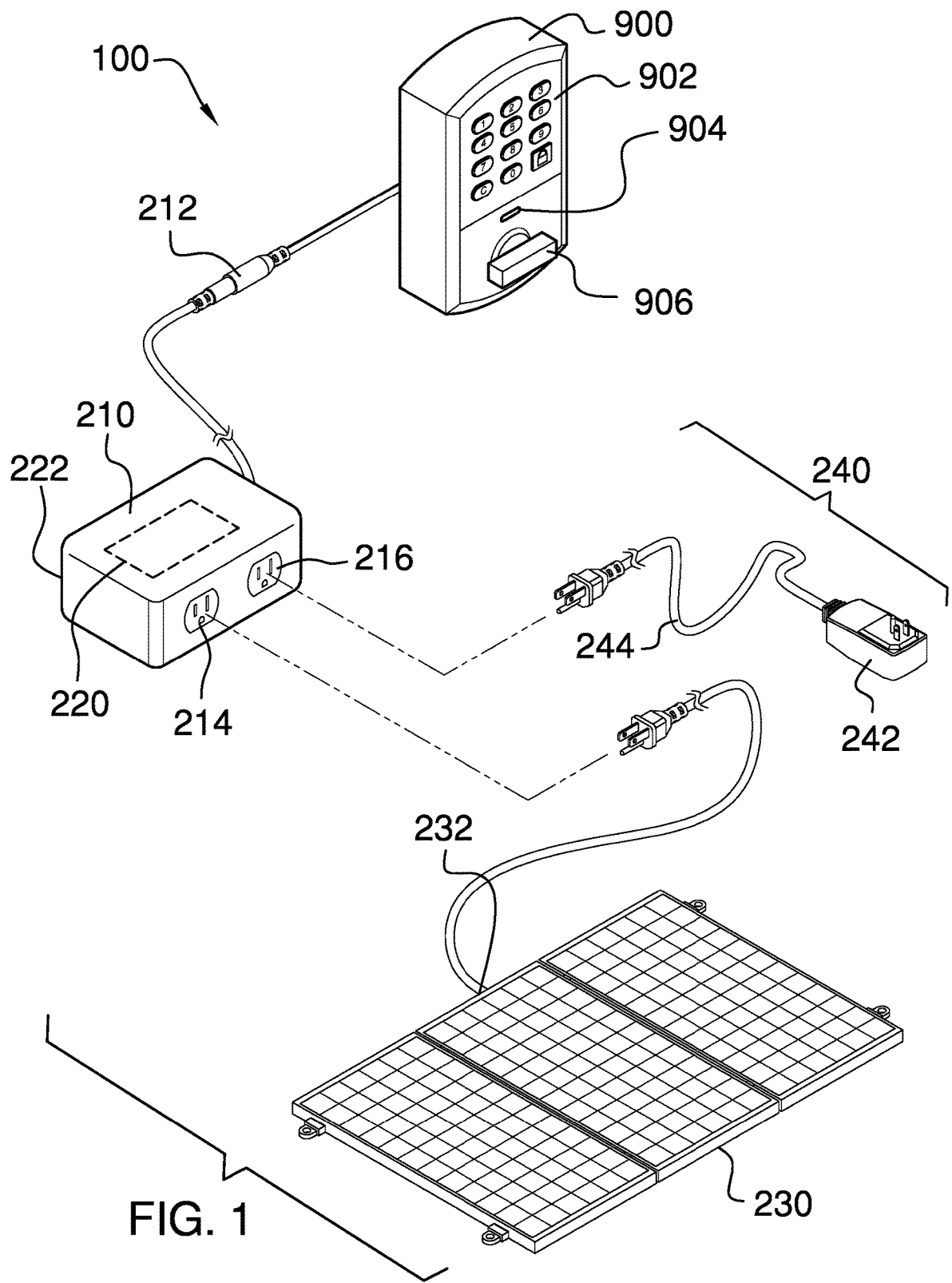
FIG. 1 is an isometric view of an embodiment of the disclosure.
Figure 2:
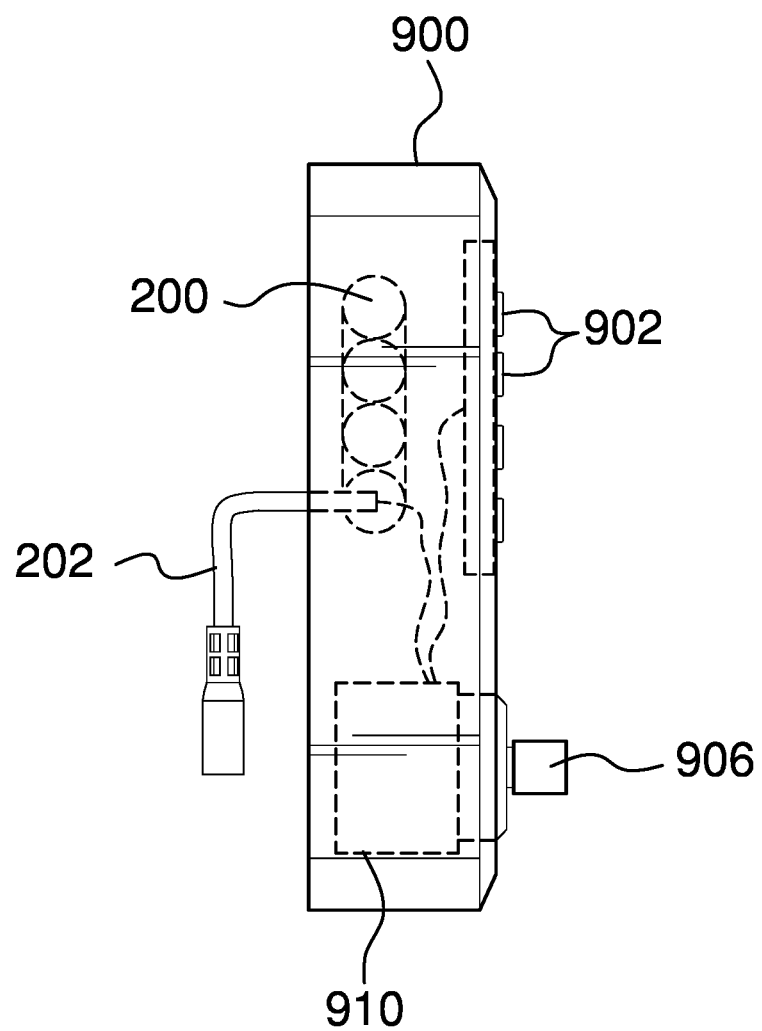
FIG. 2 is a side view of an embodiment of the disclosure, illustrating the placement of the disposable batteries within the smart lock.
Figure 3:
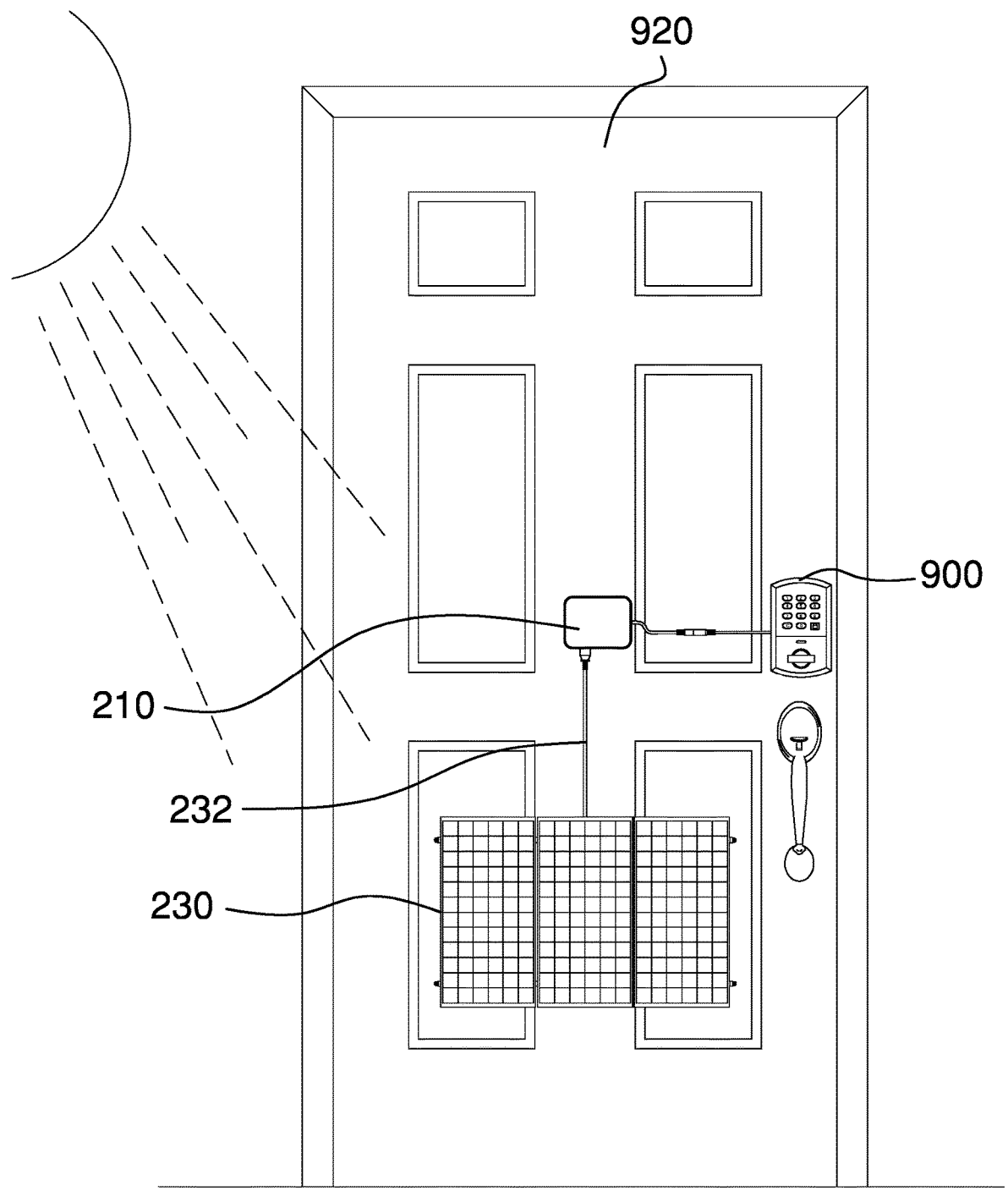
FIG. 3 is an in-use view of an embodiment of the disclosure, illustrating the use of the solar panel.
Figure 4:
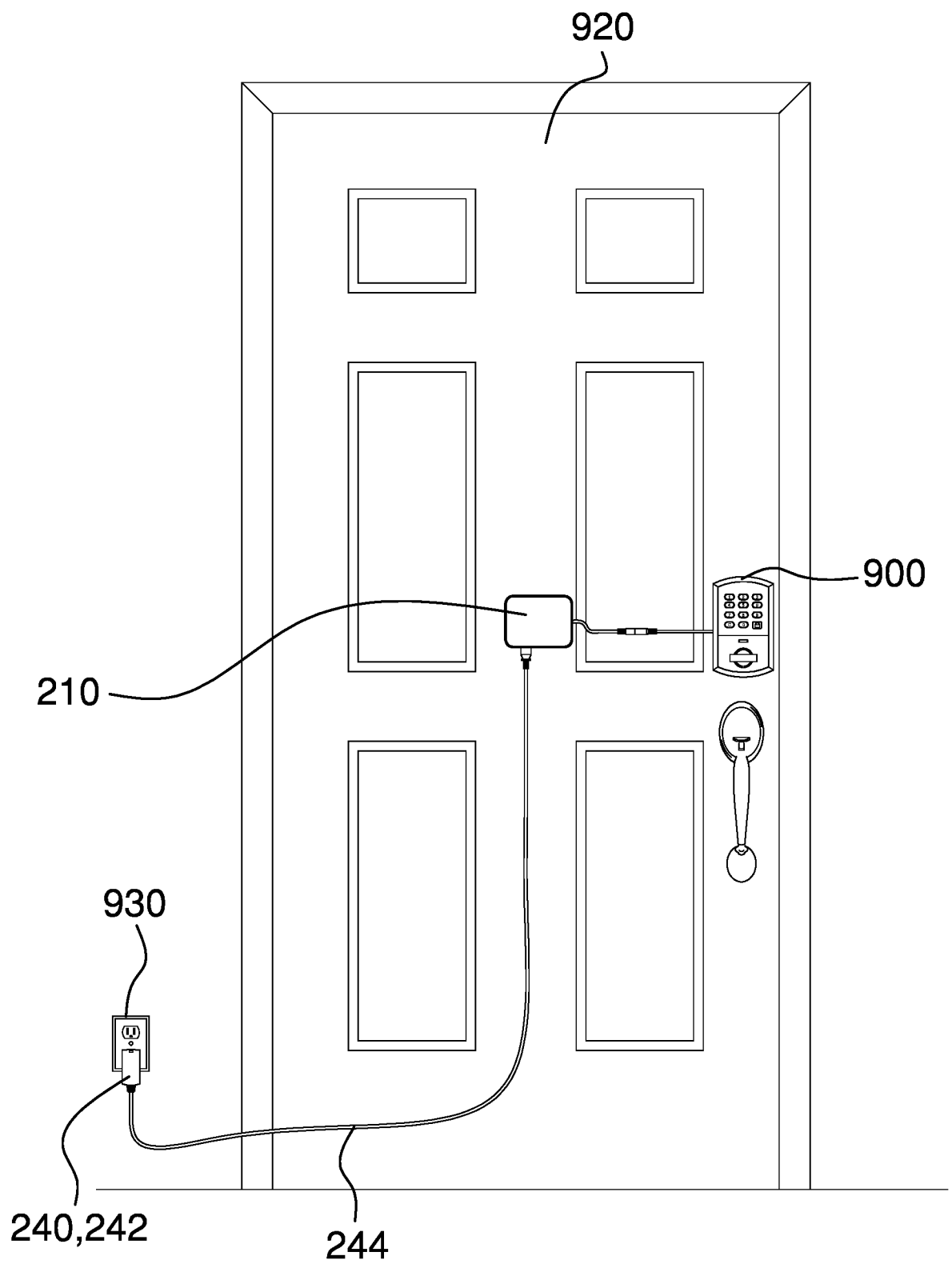
FIG. 4 is an in-use view of an embodiment of the disclosure, illustrating the use of the AC adapter.

Detailed reference will now be made to a first potential embodiment of the disclosure, which is illustrated in FIGS. 1 through 4.

The uninterrupted power supply for existing smart locks 100 (hereinafter invention) comprises one or more rechargeable batteries 200, a power conditioner 210, a solar panel 230, and an AC adapter 240. The invention 100 may be operable to provide uninterruptable power to a smart lock 900 coupled to a door 920. The one or more rechargeable batteries 200 may replace one or more disposable batteries in the smart lock 900 and May electrically couple to the power conditioner 210. The power conditioner 210 may electrically couple to the solar panel 230, the AC adapter 240, or both and may condition power from the solar panel 230 and/or the AC adapter 240 for use in recharging the one or more rechargeable batteries 200. As non-limiting examples, the solar panel 230 may be mounted on the exterior side of the door 920, the interior side of the door 920, or elsewhere on the exterior of the building.

The one or more rechargeable batteries 200 may comprise one or more energy-storage devices. The one or more rechargeable batteries 200 may be a source of electrical energy to operate the smart lock 900. The one or more rechargeable batteries 200 may be rechargeable and replaceable. In some embodiments, the one or more rechargeable batteries 200 may be packaged into a battery pack that may replace the one or more disposable batteries and a battery cover of the smart lock 900. The one or more rechargeable batteries 200 may be coupled to a battery cord 202 in order to accept a recharging current from the power conditioner 210.

The power conditioner 210 may comprise a lock-power output port 212 for coupling to the one or more rechargeable batteries in the smart lock 900, a solar panel input port 214 for coupling to the solar panel 230, and a recharger input port 216 for coupling to the AC adapter 240. The power conditioner 210 may accept power from the solar panel 230 via the solar panel input port 214. The power conditioner 210 may accept power from the AC adapter 240 via the recharger input port 216. The power conditioner 210 may provide power to the one or more rechargeable batteries 200 located in the smart lock 900 via the lock-power output port 212. In some embodiments, the power conditioner 210 may enable use of the solar panel 230 and the AC adapter 240 simultaneously.

The power conditioner 210 may be enclosed in a power conditioner housing 222 that may be mounted on or adjacent to the door 920.

In some embodiments, the power conditioner 210 may comprise a conditioning circuit 220 to condition the power provided by the solar panel 230 and/or the AC adapter 240. Conditioning the power may involve changing the voltage level, rectifying, limiting the current, selecting which input is routed to the output, or any combination thereof.

An individual port selected from the lock-power output port 212, the solar panel input port 214, and the recharger input port 216 may be a panel mounted power connector that mounts on a wall of an enclosure or an inline power connector that terminates an end of a power cord. The individual port may have a male polarity or a female polarity.

In a preferred embodiment, the solar panel input port 214 and the recharger input port 216 may be female panel connectors and the lock-power output port 212 may be a female inline connector. A male inline connector on a solar power cord 232 may plug into the solar panel input port 214. The male inline connector on an adapter power cord 244 may plug into the recharger input port 216. The male inline connector on the battery cord 202 may plug into the lock-power output port 212.

The solar panel 230 may be a device that produces electrical power when exposed to light. The solar panel 230 may use a plurality of photovoltaic cells to covert light directly into electricity. The solar panel 230 may deliver the electrical power produced by the solar panel 230 to the power conditioner via the solar power cord 232.

In a preferred embodiment, the solar panel 230 may be mounted on the exterior side of the door 920 where the solar panel 230 may be exposed to sunlight. Alternatively, the solar panel 230 may be mounted on the interior side of the door 920 where the solar panel 230 may be exposed to bright interior lighting.

The AC adapter 240 may be an electrical device that may provide power to the power conditioner 210 from a wall outlet 930. The AC adapter 240 may comprise an AC plug 242 that may plug into the wall outlet 930 and the adapter power cord 244 that may provide electrical power to the power conditioner 210. The AC adapter 240 may reduce the voltage of the electrical power from a typical household outlet voltage of 100 volts or more down to a voltage of 24 volts or less. In some embodiments, the AC adapter 240 may convert the alternating current (AC) of the household outlet to direct current (DC).

In use, a smart lock 900 may be mounted on a door 920 to prevent unauthorized access to a residential or business building. A lock mechanism 910 within the smart lock 900 may control the position of a deadbolt such that the deadbolt is extended to lock the door 920 and the deadbolt is retracted to unlock the door 920. A user may reposition the deadbolt using a knob 906 when granted permission by the lock mechanism 910. The user may be granted permission to lock the door 920 by pressing a lock button 904 while the deadbolt is retracted and the user may be granted permission to unlock the door 920 by entering a correct code using a numeric keypad 902 while the deadbolt is extended. Ordinarily, the lock mechanism 910 is powered by one or more disposable batteries which are necessary to engage the knob 906 and the deadbolt and to disengage the knob 906 and the deadbolt. However, use of the smart lock 900 may drain the one or more disposable batteries and when the one or more disposable batteries are depleted, the user may not be able to lock and unlock the smart lock 900.

The invention 100 may replace the one or more disposable batteries with one or more rechargeable batteries 200 and may provide the solar panel 230 and the AC adapter 240 as devices to keep the one or more rechargeable batteries 200 charged. The one or more rechargeable batteries 200 may be drained by use of the smart lock 900, however the solar panel 230 and/or the AC adapter 240 may recharge the one or more rechargeable batteries such that the one or more rechargeable batteries 200 may always provide enough energy to power the lock mechanism 910. During an extended period of inclement weather when the solar panel 230 may be ineffective, the AC adapter 240 may recharge the one or more rechargeable batteries 200. During an extended power outage, as a non-limiting example—a power outage lasting for several days after a hurricane strike, the solar panel 230 may recharge the one or more rechargeable batteries 200.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, "AC" may be an acronym for alternating current.

As used herein, "AC adapter" may refer to an electrical device that converts an AC input voltage of 100 to 250 volts to an AC or DC output voltage of 24 volts or below. As non-limiting examples, an AC adapter may be used to power or recharge small electrical devices such as calculators, smart phones, or cameras.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words "couple", "couples", "coupled" or "coupling", may refer to connecting, either directly or indirectly, and does not necessarily imply a mechanical connection.

As used in this disclosure, "DC" may be an acronym for direct current.

As used in this disclosure, "disposable" may be an adjective that refers to an object that is designed and intended for a limited number of uses. In some cases, the object may be intended for a single use.

As used in this disclosure, the word "exterior" may be used as a relational term that implies that an object is not located or contained within the boundary of a structure or a space.

As used in this disclosure, a "housing" may be a rigid or semi-rigid casing that encloses and protects one or more devices.

As used in this disclosure, the word "interior" may be used as a relational term that implies that an object is located or contained within the boundary of a structure or a space.

As used in this disclosure, an "outlet" may be a device placed in the electrical wiring system of a building where electrical current can be taken to run electrical devices. In this disclosure, an outlet is a socket adapted to receive a plug. In some embodiments, an outlet may find use in a vehicle or on equipment. As non-limiting examples, outlets may be used on recreational vehicles and on generators.

As used in this disclosure, a "plug" may be an electrical termination that electrically connects a first electrical circuit to a second electrical circuit or a source of electricity.

As used in this disclosure, a "port" may be an electrical termination that is used to connect a first electrical circuit to a second external electrical circuit.

As used herein, "solar panel" may refer to an assembly of solar cells that are electrically wired in series and/or in parallel in order to produce a usable DC output.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An uninterrupted power supply for existing smart locks comprising:
    one or more rechargeable batteries, a power conditioner, a solar panel, and an AC adapter;
    wherein the uninterrupted power supply for existing smart locks is operable to provide uninterruptable power to a smart lock coupled to a door;
    wherein the one or more rechargeable batteries replace one or more disposable batteries in the smart lock and electrically couple to the power conditioner;
    wherein the power conditioner electrically couples to the solar panel, the AC adapter, or both and conditions power from the solar panel and/or the AC adapter for use in recharging the one or more rechargeable batteries.

2. The uninterrupted power supply for existing smart locks according to claim 1
    wherein the one or more rechargeable batteries comprise one or more energy-storage devices;
    wherein the one or more rechargeable batteries are a source of electrical energy to operate the smart lock;
    wherein the one or more rechargeable batteries are rechargeable and replaceable.

3. The uninterrupted power supply for existing smart locks according to claim 2
    wherein the one or more rechargeable batteries are packaged into a battery pack that replace the one or more disposable batteries and a battery cover of the smart lock.

4. The uninterrupted power supply for existing smart locks according to claim 2
    wherein the one or more rechargeable batteries are coupled to a battery cord in order to accept a recharging current from the power conditioner.

5. The uninterrupted power supply for existing smart locks according to claim 4
    wherein the power conditioner comprises a lock-power output port for coupling to the one or more rechargeable batteries in the smart lock, a solar panel input port for coupling to the solar panel, and a recharger input port for coupling to the AC adapter;
    wherein the power conditioner accepts power from the solar panel via the solar panel input port.

6. The uninterrupted power supply for existing smart locks according to claim 5
    wherein the power conditioner accepts power from the AC adapter via the recharger input port.

7. The uninterrupted power supply for existing smart locks according to claim 6
    wherein the power conditioner provides power to the one or more rechargeable batteries located in the smart lock via the lock-power output port.

8. The uninterrupted power supply for existing smart locks according to claim 7
    wherein the power conditioner enables use of the solar panel and the AC adapter simultaneously.

9. The uninterrupted power supply for existing smart locks according to claim 7
    wherein the power conditioner is enclosed in a power conditioner housing that is mounted on or adjacent to the door.

10. The uninterrupted power supply for existing smart locks according to claim 7
    wherein the power conditioner comprises a conditioning circuit to condition the power provided by the solar panel and/or the AC adapter;

wherein conditioning the power involves changing the voltage level, rectifying, limiting the current, selecting which input is routed to the output, or any combination thereof.

11. The uninterrupted power supply for existing smart locks according to claim 10
wherein an individual port selected from the lock-power output port, the solar panel input port, and the recharger input port is a panel mounted power connector that mounts on a wall of an enclosure or an inline power connector that terminates an end of a power cord.

12. The uninterrupted power supply for existing smart locks according to claim 11
wherein the individual port has a male polarity or a female polarity.

13. The uninterrupted power supply for existing smart locks according to claim 12
wherein the solar panel input port and the recharger input port are female panel connectors and the lock-power output port is a female inline connector.

14. The uninterrupted power supply for existing smart locks according to claim 13
wherein a male inline connector on a solar power cord plugs into the solar panel input port;
wherein the male inline connector on an adapter power cord plugs into the recharger input port;
wherein the male inline connector on the battery cord plugs into the lock-power output port.

15. The uninterrupted power supply for existing smart locks according to claim 12
wherein the solar panel is a device that produces electrical power when exposed to light;
wherein the solar panel comprises a plurality of photovoltaic cells that covert light directly into electricity;
wherein the solar panel delivers the electrical power produced by the solar panel to the power conditioner via the solar power cord.

16. The uninterrupted power supply for existing smart locks according to claim 15
wherein the solar panel is mounted on the exterior side of the door where the solar panel is exposed to sunlight.

17. The uninterrupted power supply for existing smart locks according to claim 15
wherein the solar panel is mounted on the interior side of the door where the solar panel is exposed to interior lighting.

18. The uninterrupted power supply for existing smart locks according to claim 15
wherein the AC adapter is an electrical device that provides power to the power conditioner from a wall outlet;
wherein the AC adapter comprises an AC plug that plugs into the wall outlet and the adapter power cord that provides electrical power to the power conditioner.

19. The uninterrupted power supply for existing smart locks according to claim 18
wherein the AC adapter reduces the voltage of the electrical power from a typical household outlet voltage of 100 volts or more down to a voltage of 24 volts or less.

20. The uninterrupted power supply for existing smart locks according to claim 19
wherein the AC adapter converts the alternating current of the household outlet to direct current.

* * * * *